(12) United States Patent
Park et al.

(10) Patent No.: US 12,467,936 B2
(45) Date of Patent: Nov. 11, 2025

(54) AUTOMATIC IMMUNOASSAY SYSTEM

(71) Applicant: ABSOLOGY Co., Ltd., Anyang-si (KR)

(72) Inventors: Min Cheol Park, Seoul (KR); Han Sang Jo, Gwacheon-si (KR)

(73) Assignee: ABSOLOGY Co., Ltd., Anyang-si (KR)

( * ) Notice: Subject to any disclaimer, the term of this patent is extended or adjusted under 35 U.S.C. 154(b) by 579 days.

(21) Appl. No.: 17/889,399

(22) Filed: Aug. 17, 2022

(65) Prior Publication Data

US 2023/0296641 A1 Sep. 21, 2023

(30) Foreign Application Priority Data

Mar. 21, 2022 (KR) .......................... 10-2022-0034923

(51) Int. Cl.
  *G01N 35/04* (2006.01)
  *G01N 21/64* (2006.01)
  *G01N 35/10* (2006.01)

(52) U.S. Cl.
  CPC ......... *G01N 35/04* (2013.01); *G01N 21/6428* (2013.01); *G01N 2035/0415* (2013.01); *G01N 35/10* (2013.01)

(58) Field of Classification Search
  CPC ........................... G01N 35/04; G01N 21/6428
  See application file for complete search history.

(56) References Cited

U.S. PATENT DOCUMENTS

| | | | |
|---|---|---|---|
| 2005/0206895 A1* | 9/2005 | Salmelainen | G01N 21/6408 356/318 |
| 2021/0311033 A1* | 10/2021 | Choi | G01N 35/04 |
| 2022/0163548 A1* | 5/2022 | Cho | G01N 35/00029 |

FOREIGN PATENT DOCUMENTS

| | | |
|---|---|---|
| KR | 10-1809645 B1 | 12/2017 |
| KR | 10-2020-0015316 A | 2/2020 |

OTHER PUBLICATIONS

Office Action of Korean Patent Application No. 10-2022-0034923 dated Jul. 24, 2024.

* cited by examiner

*Primary Examiner* — Maris R Kessel
*Assistant Examiner* — May Leung Chiu
(74) *Attorney, Agent, or Firm* — Revolution IP, PLLC

(57) ABSTRACT

An automatic immunoassay system is provided to an automatic immunoassay apparatus and includes a well cartridge provided with a plurality of wells in which a tip mounted on the automatic immunoassay apparatus is sequentially dipped, a cartridge loading mechanism coupled to a lower portion of the well cartridge to couple the well cartridge to the holding plate, a light source unit disposed at one side of the cartridge unit to emit light to the wells, a sensing unit disposed at the other side of the cartridge unit to detect a fluorescence signal generated by light delivered to the wells, and an assay unit analyzing the fluorescence signals detected by the sensing unit.

4 Claims, 12 Drawing Sheets

AUTOMATIC IMMUNOASSAY SYSTEM

FIELD

The present invention relates to an automatic immunoassay system, and more particularly to an automatic immunoassay system capable of performing photo-oxidation fluorescence amplification assay with greater convenience through automatic movement of a tip to a plurality of wells containing solutions performing different roles, respectively.

BACKGROUND

In recent years, with the completion of the human genome project and the advent of the postgenomic era, it becomes difficult to rapidly treat large amounts of micro-data pouring out of existing laboratory assay systems.

Accordingly, implementation of a micro-comprehensive assay system or lab-on-a-chip to perform rapid assay on rapidly increasing micro-data can be effectively achieved through combination with suitable bioassay methods.

Methods for assay of biomolecules include immunoassays, DNA hybridization, receptor-based assay, and the like. A detection method for assay of the biomolecules is broadly used not only in laboratory assay, but also in medical diagnosis or development of new medicines.

Among these methods, enzyme-linked immunosorbent assay (ELISA) is an experimental method that confirms an antigen-antibody reaction through an enzyme bound to an antibody, and is mainly used to perform qualitative and quantitative assay of the antibody or antigen. The enzyme-linked immunosorbent assay is a simple and accurate test method and can analyze many samples at once.

However, there are problems in that, in order to perform a process of attaching samples, antibodies and antigens to a tip, a cleaning process, and a sensing process in wells each containing a corresponding solution, it is necessary to provide individual wells for the corresponding purposes and to dip a tip in the wells and the time for experiment is increased due to a process of moving the tip to the wells having different roles.

Moreover, since a well having completed reaction must be moved to a separate assay system, there are problems of a complicated experiment process and deformation of an assay target specimen in the course of moving the well.

Related Literature

Patent Document

Korean Patent Registration No. 10-1809645 (Title of the Invention: Automatic immunoassay system, Issue Date: Dec. 15, 2017)

SUMMARY

Embodiments of the present invention are conceived to solve such problems in the art and it is an object of the present invention to provide an automatic immunoassay system capable of performing photo-oxidation fluorescence amplification assay with greater convenience through automatic movement of a tip to a plurality of wells containing solutions performing different roles, respectively.

It will be understood that objects of the present invention are not limited to the above. The above and other objects of the present invention will become apparent to those skilled in the art from the detailed description of the following embodiments in conjunction with the accompanying drawings.

In accordance with one aspect of the present invention, an automatic immunoassay system includes: a case provided with a holding plate therein; a cartridge unit disposed inside the case to be coupled to the holding plate and formed with a plurality of wells; a light source unit disposed at one side of the cartridge unit to emit light to the wells; a sensing unit disposed at the other side of the cartridge unit to detect a fluorescence signal generated by light delivered to the wells; a cartridge conveyance unit coupled to the cartridge unit and the holding plate and moving the cartridge unit on the holding plate in a horizontal direction; a tip disposed above the cartridge unit to be sequentially dipped in the plurality of wells; and a tip conveyance unit coupled to an upper surface of the holding plate and moving the tip in an upward/downward direction.

The cartridge unit may include: a well cartridge provided with the plurality of wells; and a cartridge loading mechanism coupled to a lower portion of the well cartridge to couple the well cartridge to the holding plate.

The cartridge conveyance unit may include: a cartridge mount coupling the cartridge unit to the holding plate; and a cartridge conveyer conveying the cartridge mount in a horizontal direction with reference to the holding plate.

The tip conveyance unit may include: a tip holder holding the tip; and a tip conveyer conveying the tip holder in the upward/downward direction.

The automatic immunoassay system according to the present invention provides the following effects.

First, the automatic immunoassay system enables photo-oxidation fluorescence amplification assay with greater convenience through automatic movement of a tip to a plurality of wells containing solutions performing different roles.

Second, in the automatic immunoassay system, the plurality of wells containing solutions performing different roles is disposed in a single cartridge, and the light source unit is integrally formed with the sensing unit, thereby enabling photo-oxidation fluorescence amplification assay with greater convenience.

Thirdly, the automatic immunoassay system includes a shutter unit disposed between the light source unit and the wells to block light emitted from the light source unit to the wells or to allow the light emitted from the light source unit to reach the wells, thereby enabling more accurate assay through irradiation of the well with the light emitted from the light source unit after completion of warm-up of the light source unit so as to allow irradiation of a sample with uniform light when there is a need for warm-up of the light source unit.

It will be understood that advantageous effects of the present invention are not limited to the above and include any advantageous effects conceivable from the features disclosed in the detailed description of the invention or the appended claims.

DRAWINGS

The above and other aspects, features, and advantages of the present invention will become apparent from the detailed description of the following embodiments in conjunction with the accompanying drawings.

DETAILED DESCRIPTION

Hereinafter, exemplary embodiments of the invention will be described in detail with reference to the accompanying drawings. It should be understood that the present invention is not limited to the following embodiments and may be embodied in different ways, and that the embodiments are given to provide complete disclosure of the invention and to provide thorough understanding of the invention to those skilled in the art. The scope of the invention is limited only by the accompanying claims and equivalents thereto. Like components will be denoted by like reference numerals throughout the specification.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

It will be understood that when an element is referred to as being "connected" to or "on" another element, it can be directly on the other element, or intervening elements may also be present. In contrast, when an element is referred to as being "directly connected" to or "directly on" another element, there are no intervening elements present. Other expressions for describing a relationship between components should be interpreted in the same way as above.

Unless otherwise defined herein, all terms including technical or scientific terms used herein have the same meanings as commonly understood by those skilled in the art to which the present invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Figure 1:
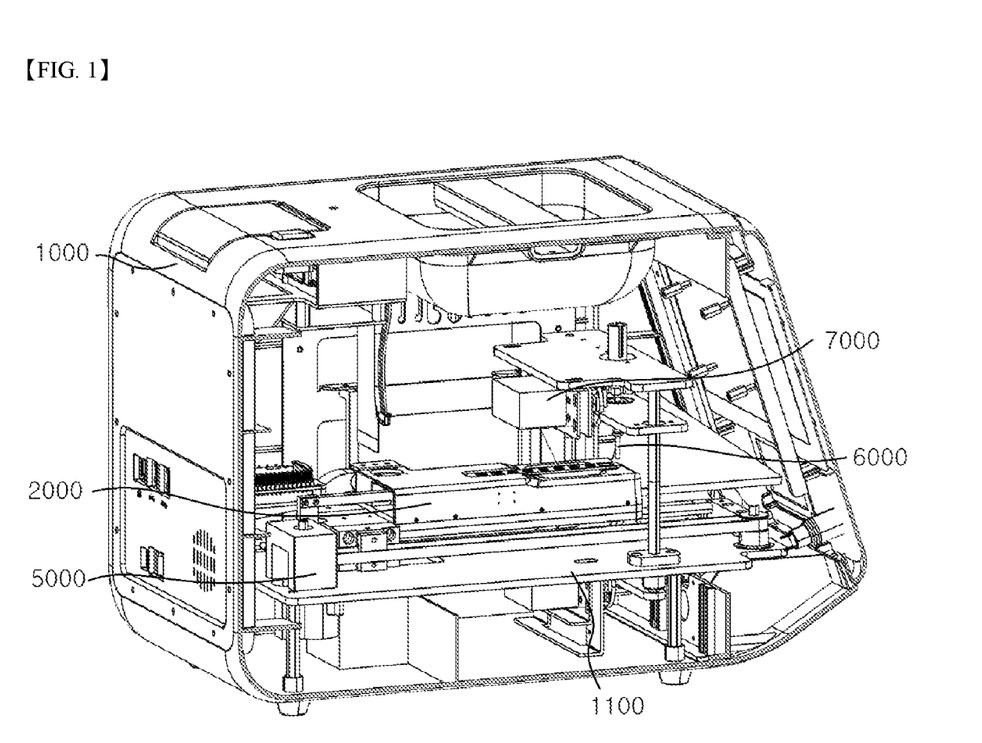
FIG. 1 and FIG. 2 are schematic views of an automatic immunoassay system according to the present invention.
Figure 2:
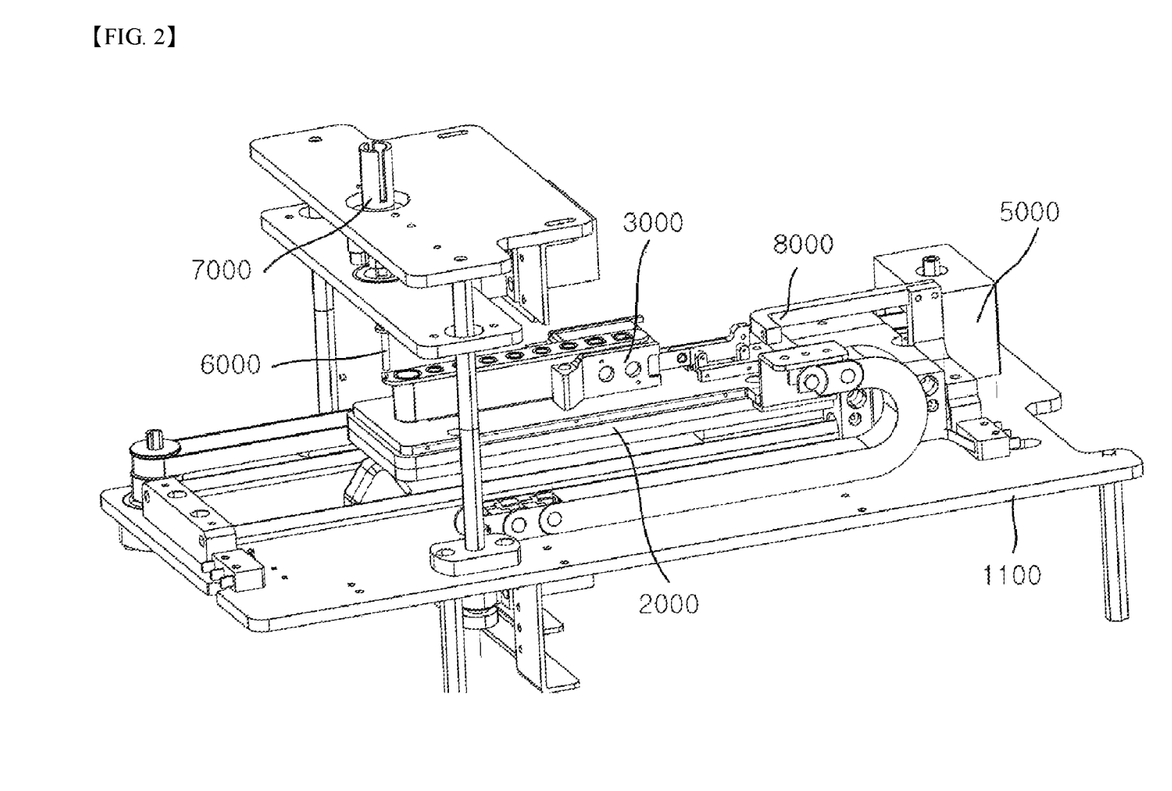

FIG. 1 and FIG. 2 are schematic views of an automatic immunoassay system according to the present invention.

Referring to FIG. 1 and FIG. 2, the automatic immunoassay system according to the present invention includes a case 1000, a cartridge unit 2000, a light source unit 3000, a sensing unit 4000, a cartridge conveyance unit 5000, a tip 6000, a tip conveyance unit 7000, and a shutter unit 8000.

In the case 1000, the cartridge unit 2000, the light source unit 3000, the sensing unit 4000, the cartridge conveyance unit 5000, the tip 6000, the tip conveyance unit 7000, and the shutter unit 8000 are disposed to allow the automatic immunoassay system according to the present invention to be conveniently carried out by a user.

The case 1000 may be formed at an upper portion thereof with a gripper and is provided therein with a holding plate 1100 to which the cartridge unit 2000, the light source unit 3000, the sensing unit 4000, the cartridge conveyance unit 5000, the tip 6000, the tip conveyance unit 7000, and the shutter unit 8000 are coupled.

The holding plate 1100 may be disposed parallel to the ground and be separated a constant distance from a lower surface of the case 1000.

The cartridge unit 2000 is disposed inside the case 1000 and is coupled to the holding plate 1100. The cartridge unit 2000 is formed with a plurality of wells, which contain a coating solution, an antibody-antigen reaction solution, a cleaning solution, and an enzyme-matrix reaction solution to perform photo-oxidation fluorescence amplification assay.

The light source unit 3000 is disposed at one side of the cartridge unit 2000 to emit light to the wells.

The sensing unit 4000 is disposed at the other side of the cartridge unit 2000 to face the light source unit 3000 and senses a fluorescence signal generated by light delivered to the wells.

The cartridge conveyance unit 5000 is coupled to the cartridge unit 2000 and the holding plate 1100 to convey the cartridge unit 2000 on the holding plate 1100 in a horizontal direction.

The tip 6000 is disposed above the cartridge unit 2000 to be sequentially dipped in the plurality of wells.

The tip conveyance unit 7000 is coupled to an upper surface of the holding plate 1100 to convey the tip 6000 in an upward/downward direction.

The shutter unit 8000 is disposed and moved between the light source unit 3000 and the wells to block light emitted from the light source unit 3000 to the wells or to allow the light emitted from the light source unit 3000 to reach the wells.

Details of the cartridge unit 2000, the light source unit 3000, the sensing unit 4000, the cartridge conveyance unit 5000, the tip 6000, the tip conveyance unit 7000, and the shutter unit 8000 will be described with reference to FIG. 3 to FIG. 12.

Referring to FIG. 3 to FIG. 8, the cartridge unit 2000 of the automatic immunoassay system according to the present invention will be described hereinafter.

Figure 3:
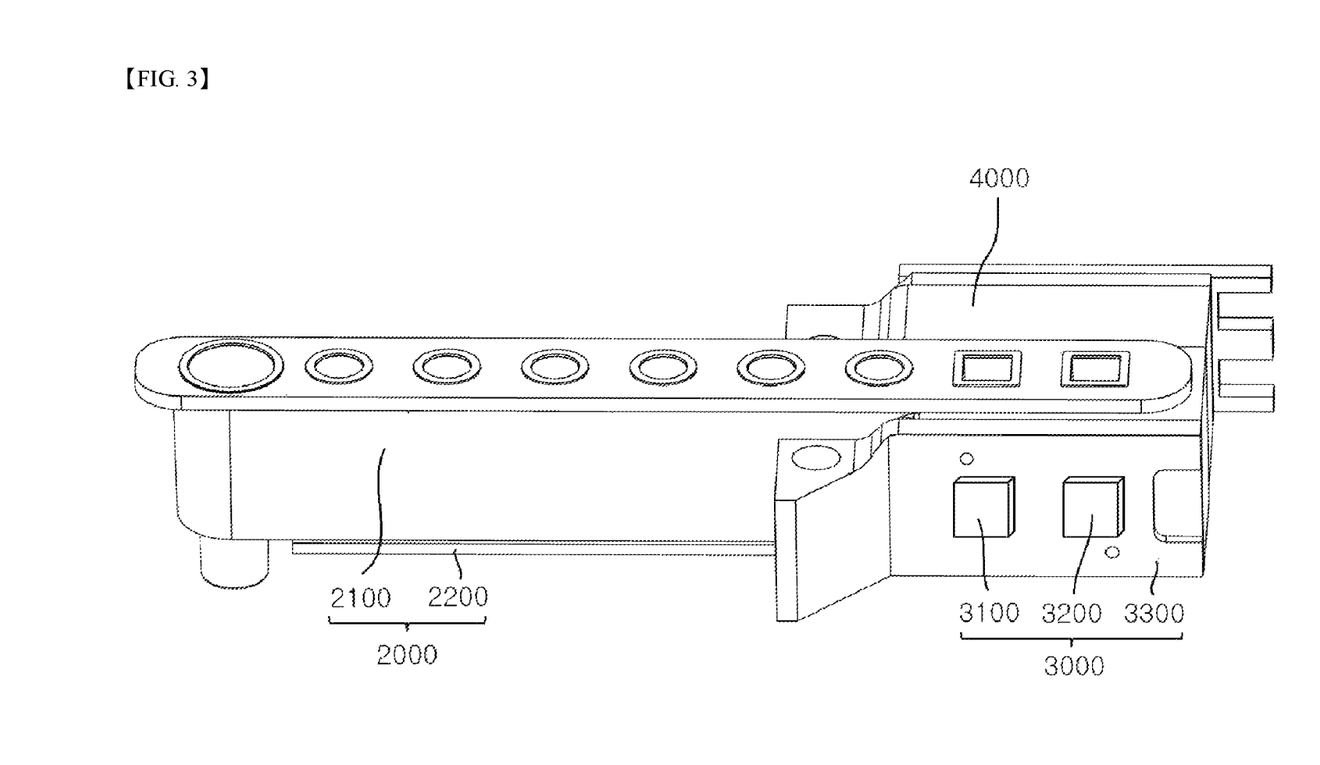
FIG. 3 is a view of a cartridge unit, a light source unit and a sensing unit in the automatic immunoassay system according to the present invention.

FIG. 3 is a view of the cartridge unit 2000, the light source unit 3000 and the sensing unit 4000 in the automatic immunoassay system according to the present invention. Referring to FIG. 3, the cartridge unit 2000 includes a well cartridge 2100 and a cartridge loading mechanism 2200.

The well cartridge 2100 is provided with the plurality of wells in which the tip 6000 is sequentially dipped.

The cartridge loading mechanism 2200 is coupled to a lower portion of the well cartridge 2100 to couple the well cartridge 2100 to the cartridge conveyance unit 5000.

The light source unit 3000 is disposed at one side of a seventh well 2180 and an eighth well 2190 in the well cartridge 2100 to emit light to the wells.

The light source unit 3000 includes a first light source 3100, a second light source 3200, and a light source unit mounting block 3300.

The first light source 3100 is disposed at one side of the seventh well 2180 to emit light to the seventh well 2180 and the second light source 3200 is disposed at one side of the eighth well 2190 to emit light to the eighth well 2190.

The light source unit mounting block 3300 is disposed at one side of the cartridge loading mechanism 2200 and the light source unit 3000 is mounted on the light source unit mounting block 3300.

The sensing unit 4000 is disposed at the other side of the seventh well 2180 and the eighth well 2190 of the well cartridge 2100 to detect a fluorescence signal generated by light delivered to the wells.

The sensing unit 4000 includes a first sensor 4100, a second sensor 4200, and a sensing unit mounting block 4300.

The first sensor 4100 is disposed at the other side of the seventh well 2180 to detect a fluorescence signal generated by light delivered to the seventh well 2180, and the second sensor 4200 is disposed at the other side of the eighth well 2190 to detect a fluorescence signal generated by light delivered to the eighth well 2190.

In addition, the automatic immunoassay system according to the present invention may include an assay unit (not shown), which analyzes the fluorescence signals detected by the sensing unit 4000.

Figure 4:
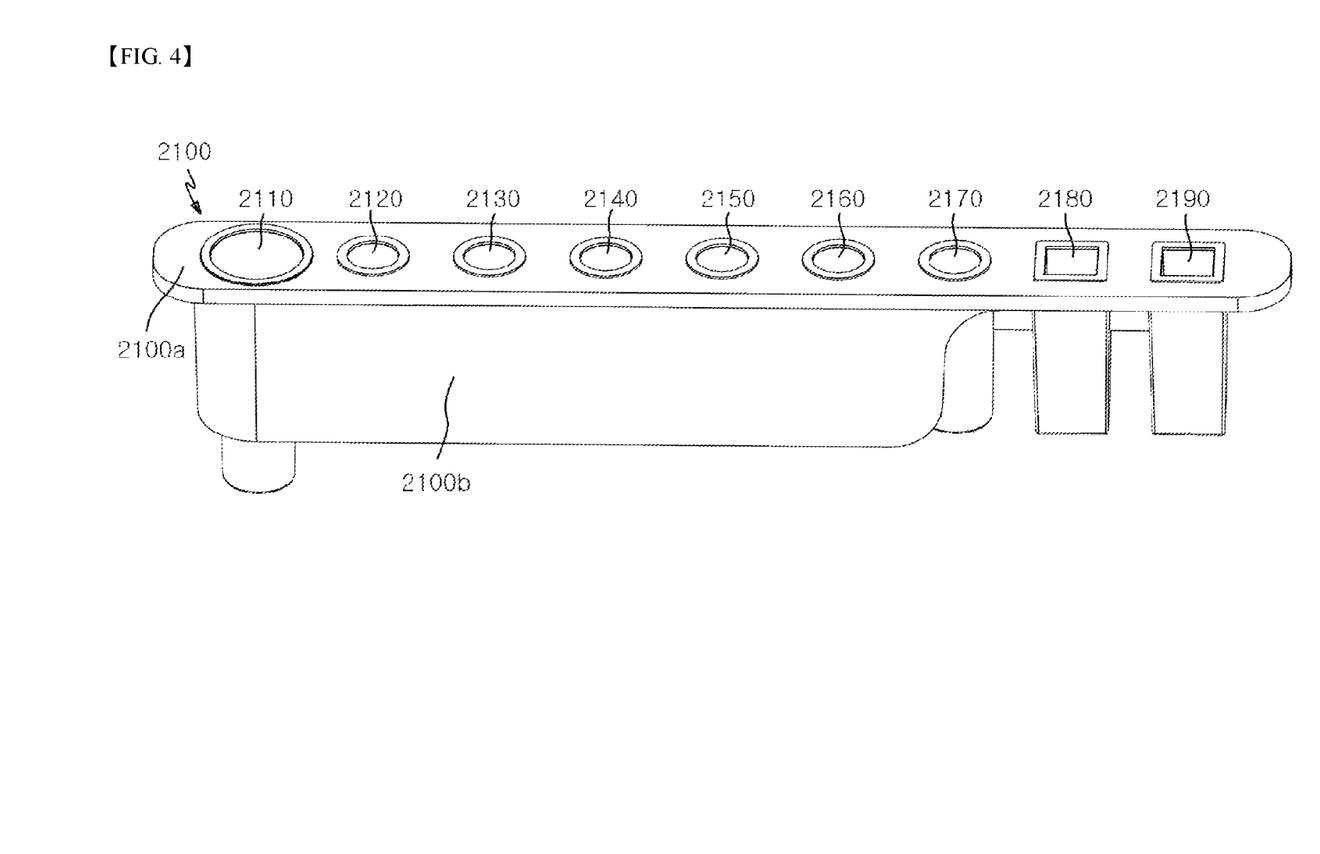
FIG. 4 is a view of a well cartridge in the automatic immunoassay system according to the present invention.

FIG. 4 is a view of the well cartridge 2100 in the automatic immunoassay system according to the present invention. Referring to FIG. 4, the well cartridge 2100 includes a tip storage well 2110, first to eighth wells 2120 to 2190, a well holder 2100a, and a well protecting portion 2100b.

The tip storage well 2110 and the first to fourth wells 2120 to 2190 are formed in a tube shape such that the tip 6000 can be inserted thereinto, and are integrally formed with one another to be coupled to one another.

The tip storage well 2110 defines a standby space for the tip 6000 before conveyance of the tip and receives the tip 6000 therein.

The first to fourth wells 2120 to 2190 receive the coating solution and the antibody-antigen reaction solution such that the tip 6000 is sequentially received in the first to fourth wells 2120 to 2150 to form an antibody-antigen complex on the tip 6000.

The fifth well 2160 and the sixth well 2170 receive the cleaning solution such that the tip formed with the antibody-antigen complex is subjected to cleaning in two stages to remove an antibody not forming the antibody-antigen complex, after the tip 6000 is sequentially received in the first to fourth wells 2120 to 2150.

The seventh well 2180 and the eighth well 2190 receive the enzyme-matrix reaction solution such that the amount of an antigen coupled to an antibody can be measured through enzyme-matrix reaction of the tip 6000 therewith in these wells.

Here, the seventh well 2180 is a test target well and the eighth well 2190 is a reference well for comparison with the seventh well 2180.

The tip storage well 2110 and the first to eighth wells 2120 to 2190 are sequentially disposed such that the tip 6000 can conveniently perform antibody-antigen immunoassay and can check fluorescence reaction while moving in the horizontal direction.

The well holder 2100a is coupled to an outer periphery of an upper surface of each of the tip storage well 2110 and the first to eighth wells 2120 to 2190 such that the tip storage well 2110 is integrated with the first to eighth wells 2120 to 2190.

The well protecting portion 2100b protrudes from a lower portion of the well holder 2100a, particularly from lower regions of the well holder 2100a corresponding to the tip storage well 2110 and the first to eighth wells 2120 to 2170, to protect the tip storage well 2110 and the first to eighth wells 2120 to 2170 from external light and the like.

Figure 5:
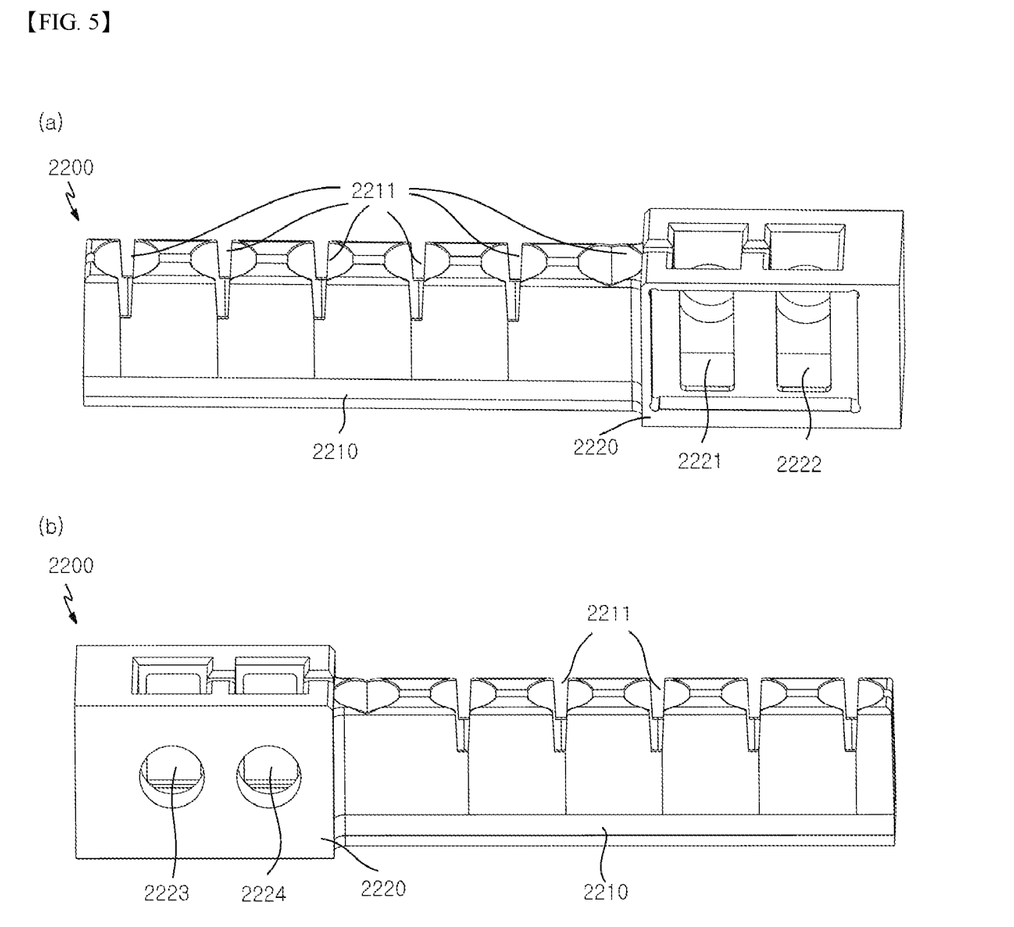
FIG. 5 is a view of a cartridge loading mechanism in the automatic immunoassay system according to the present invention.

FIG. 5 is a view of the cartridge loading mechanism 2200 in the automatic immunoassay system according to the present invention. Referring to FIG. 5, the cartridge loading mechanism 2200 includes a well support 2210 and a well cover 2220.

The well support 2210 is coupled at a lower portion thereof to the cartridge conveyance unit 5000 and is formed at an upper portion thereof with a plurality of well insertion holes 2211, into which lower portions of the first to eighth wells 2120 to 2190 are inserted.

The well insertion holes 2211 are formed in a shape surrounding the lower portions of the first to eighth wells 2120 to 2190, respectively, such that the well support 2210 supports and secures the first to eighth wells 2120 to 2190 when the first to eighth wells 2120 to 2190 are inserted into the well insertion holes 2211.

The well cover 2220 protrudes from an upper surface of the well support 2210 to surround the seventh well 2180 and the eighth well 2190 in the well support 2210.

Here, the well cover 2220 is formed at one side thereof with a first cover hole 2221 and a second cover hole 2222 such that one side of each of the seventh well 2180 and the eighth well 2190 is open through the corresponding cover hole.

The well cover 2220 is formed at the other side thereof with a third cover hole 2223 and a fourth cover hole 2224 such that the other side of each of the seventh well 2180 and the eighth well 2190 is open through the corresponding cover hole.

Figure 6:
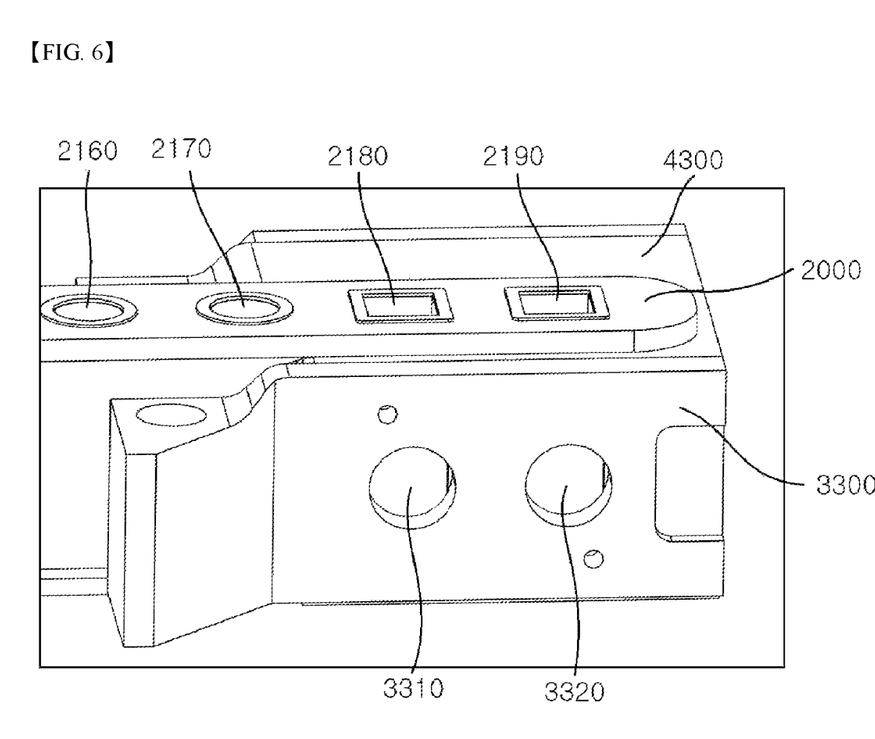
FIG. 6 is a view of a light source unit mounting block in the automatic immunoassay system according to the present invention.

FIG. 6 is a view of the light source unit mounting block 3300 in the automatic immunoassay system according to the present invention. Referring to FIG. 6, the light source unit mounting block 3300 is coupled to one side of the well cover 2220.

The light source unit mounting block 3300 is formed with a first light source coupling hole 3310 and a second light source coupling hole 3320 in regions thereof corresponding to the first cover hole 2221 and the second cover hole 2222.

The first light source 3100 is inserted into and coupled to the first light source coupling hole 3310 and the second light source 3200 is inserted into and coupled to the second light source coupling hole 3320 such that the light source unit 3000 can emit light towards the seventh well 2180 and the eighth well 2190.

Figure 7:
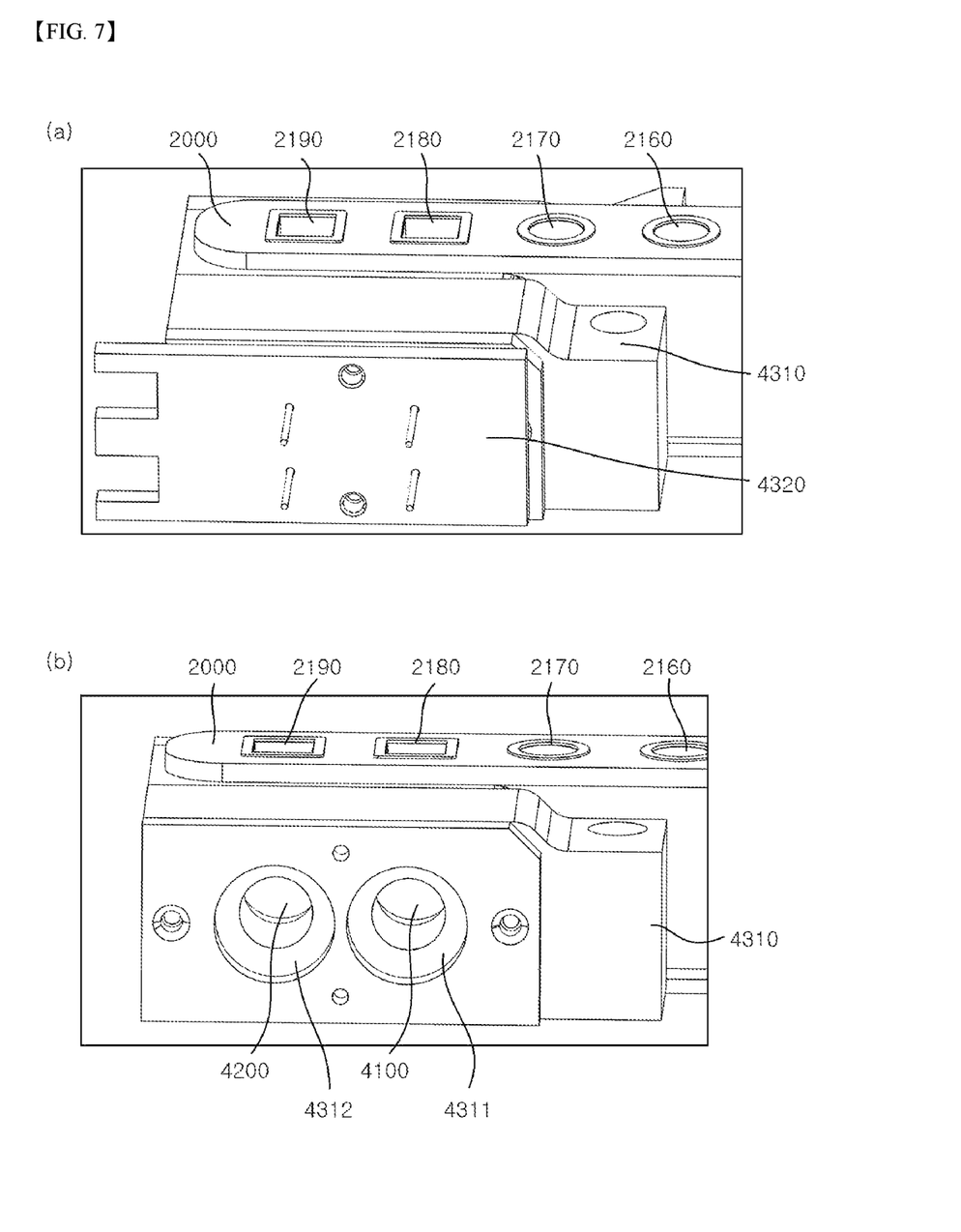
FIG. 7 is a view of a sensing unit mounting block in the automatic immunoassay system according to the present invention.

FIG. 7 is a view of the sensing unit mounting block 4300 in the automatic immunoassay system according to the present invention. Referring to FIG. 7, the sensing unit mounting block 4300 is coupled to the other side of the well cover 2220. Specifically, the sensing unit mounting block 4300 includes a sensing unit-insertion block 4310 and a sensing printed circuit board 4320.

The sensing unit-insertion block 4310 is coupled to the other side of the well cover 2220 and is formed with a first sensor coupling hole 4311 and a second sensor coupling hole 4312 in regions thereof corresponding to the third cover hole 2223 and the fourth cover hole 2224.

The first sensor 4100 is inserted into and coupled to the first sensor coupling hole 4311 and the second sensor 4200 is inserted into and coupled to the second sensor coupling hole 4312 such that the sensing unit 4000 can detect a fluorescence signal generated by light delivered to the seventh well 2180 and the eighth well 2190.

The sensing printed circuit board 4320 is coupled to the sensing unit-insertion block 4310 to be connected to the first sensor 4100 and the second sensor 4200 such that the fluorescence signal detected by the sensing unit 4000 can be sent to and analyzed by the assay unit.

Figure 8:
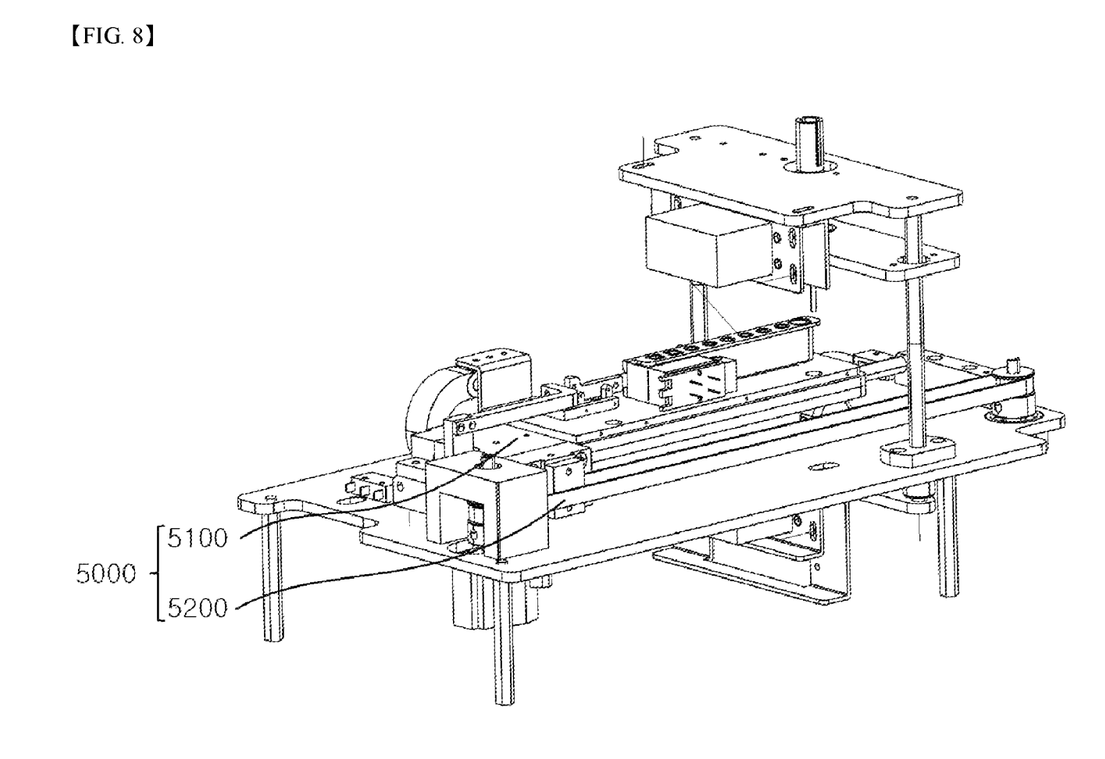
FIG. 8 is a view of a cartridge conveyance unit in the automatic immunoassay system according to the present invention.

FIG. 8 is a view of the cartridge conveyance unit 5000 in the automatic immunoassay system according to the present invention. Referring to FIG. 8, the cartridge conveyance unit 5000 includes a cartridge mount 5100 and a cartridge conveyer 5200.

The cartridge conveyance unit 5000 couples the cartridge unit 2000 to the holding plate 1100 such that the cartridge unit 2000 can be conveyed thereon.

The cartridge conveyer 5200 conveys the cartridge mount 5100 in the horizontal direction with reference to the holding plate 1100.

Figure 9:
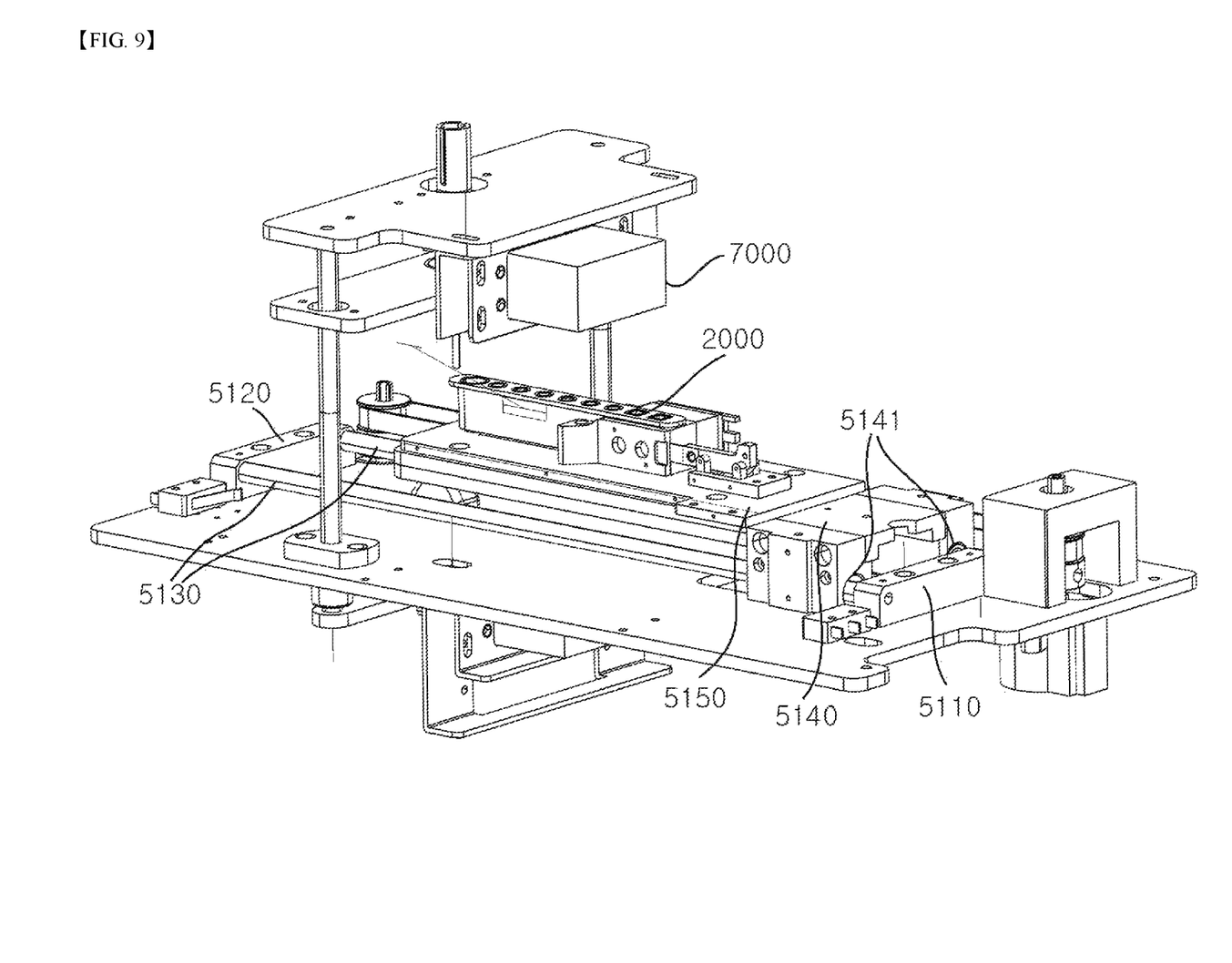
FIG. 9 is a view of a cartridge mount in the automatic immunoassay system according to the present invention.

FIG. 9 is a view of the cartridge mount 5100 in the automatic immunoassay system according to the present invention. Referring to FIG. 9, the cartridge mount 5100 includes a first guide bar holding frame 5110, a second guide bar holding frame 5120, a conveyance guide bar 5130, a conveyance frame 5140, and a cartridge mounting plate 5150.

The first guide bar holding frame 5110 and the second guide bar holding frame 5120 are coupled to opposite ends of the holding plate 1100 with reference to a longitudinal direction of the holding plate 1100, that is, in a direction in which the cartridge unit 2000 is conveyed, respectively.

The conveyance guide bar 5130 is coupled at opposite ends thereof to the first guide bar holding frame 5110 and the second guide bar holding frame 5120, respectively. Although the conveyance guide bar 5130 may be composed of a single guide bar, the conveyance guide bar is preferably composed of two or more guide bars disposed at both sides of the cartridge unit 2000.

The conveyance frame 5140 is formed with a guide bar passing hole 5141, through which the conveyance guide bar 5130 passes. Accordingly, as the conveyance guide bar 5130 is inserted into the guide bar passing hole 5141, the conveyance frame 5140 is coupled to the conveyance guide bar 5130 to be moved in the horizontal direction with reference to the conveyance guide bar 5130.

The cartridge mounting plate 5150 is coupled to an upper portion of the conveyance frame 5140. Accordingly, as the conveyance frame 5140 is conveyed in the horizontal direction with reference to the conveyance guide bar 5130, the cartridge mounting plate 5150 is also conveyed together with the conveyance frame 5140 in the same direction.

In addition, the cartridge unit 2000, the light source unit 3000 and the sensing unit 4000 are coupled to an upper surface of the cartridge mounting plate 5150. Accordingly, as the cartridge mounting plate 5150 is conveyed in the horizontal direction, the cartridge unit 2000, the light source unit 3000 and the sensing unit 4000 are also conveyed in the same direction at the same speed as the cartridge mounting plate 5150.

Figure 10:
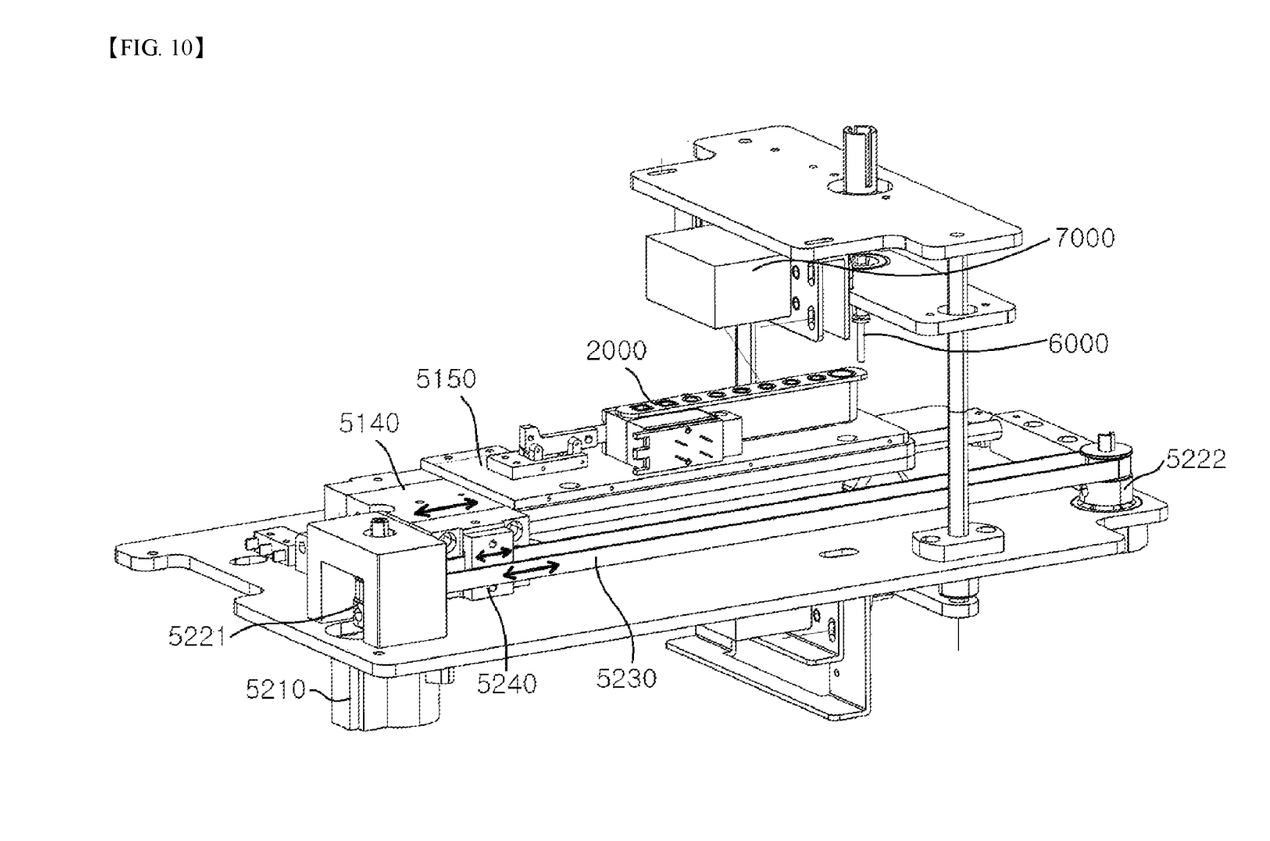
FIG. 10 is a view of a cartridge conveyer in the automatic immunoassay system according to the present invention.

FIG. 10 is a view of the cartridge conveyer 5200 in the automatic immunoassay system according to the present invention. Referring to FIG. 10, the cartridge conveyer is coupled to the cartridge mount 5100 to convey the cartridge mount 5100 in the horizontal direction. Specifically, the cartridge conveyer 5200 includes a stepper motor 5210, a rotary block, a timing belt 5230, and a conveyance block 5240.

The stepper motor 5210 serves to provide drive power for driving the rotary block described below. Referring to FIG. 10, the stepper motor 5210 is disposed under the holding plate 1100, thereby enabling a compact design of the automatic immunoassay system according to the present invention.

The rotary block includes a first rotary block 5221 and a second rotary block 5222. The first rotary block 5221 and the second rotary block 5222 are coupled to the upper surface of the holding plate 1100, in which the first rotary block 5221 is separated from a side surface of the first guide bar holding frame 5110 and the second rotary block 5222 is separated from a side surface of the second guide bar holding frame 5120.

Preferably, each of the first rotary block 5221 and the second rotary block 5222 has a cylindrical shape and is formed in a perpendicular direction with respect to the upper surface of the holding plate 1100.

The stepper motor 5210 is coupled to the first rotary block 5221 to rotate the first rotary block 5221 in the clockwise direction or in the counterclockwise direction.

The timing belt 5230 is coupled to outer surfaces of the first rotary block 5221 and the second rotary block 5222 to cooperate therewith. Accordingly, when the stepper motor 5210 is driven, the first rotary block 5221 is rotated to allow the timing belt 5230 engaging with the first rotary block 5221 to be rotated together therewith, and the second rotary block 5222 is also rotated by rotation of the timing belt 5230.

That is, the second rotary block 5222 assists in rotation of the timing belt 5230 while maintaining tension of the timing belt 5230.

The outer surfaces of the first rotary block 5221 and the second rotary block 5222 are formed with the same shape of roughness as an inner surface of the timing belt 5230, which engages with the outer surfaces of the first rotary block 5221 and the second rotary block 5222 to allow more efficient transfer of rotating force.

The conveyance block 5240 is coupled to the timing belt to be conveyed on the timing belt 5230 by rotation of the timing belt 5230. In addition, as the conveyance block 5240 is conveyed in the same direction as the timing belt 5230 upon rotation of the timing belt 5230 secured to the conveyance frame 5140, the conveyance frame 5140 is rotated together with the timing belt 5230, thereby allowing conveyance of the cartridge unit 2000 in the horizontal direction.

Figure 11:
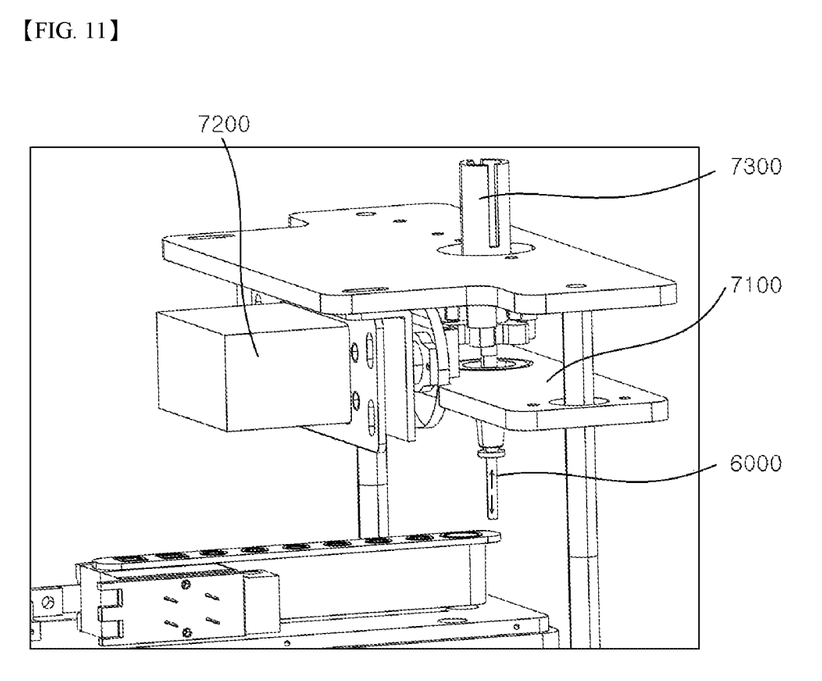
FIG. 11 is a view of a tip conveyance unit in the automatic immunoassay system according to the present invention.

FIG. 11 is a view of the tip conveyance unit 7000 in the automatic immunoassay system according to the present invention. Referring to FIG. 11, the tip conveyance unit 7000 includes a tip holder 7100, a tip conveyance unit 7200, and a tip vibrator 7300.

The tip holder 7100 is coupled to an upper surface of the holding plate 1100 and to the tip 6000.

As the tip holder 7100 is conveyed in the upward/downward direction, the tip conveyance unit 7200 conveys the tip 6000 to be dipped in the plurality of wells.

The tip vibrator 7300 is coupled to the tip holder 7100 to allow more efficient culturing, cleaning and reaction by vibrating the tip when the tip 6000 is dipped in the well.

Figure 12:
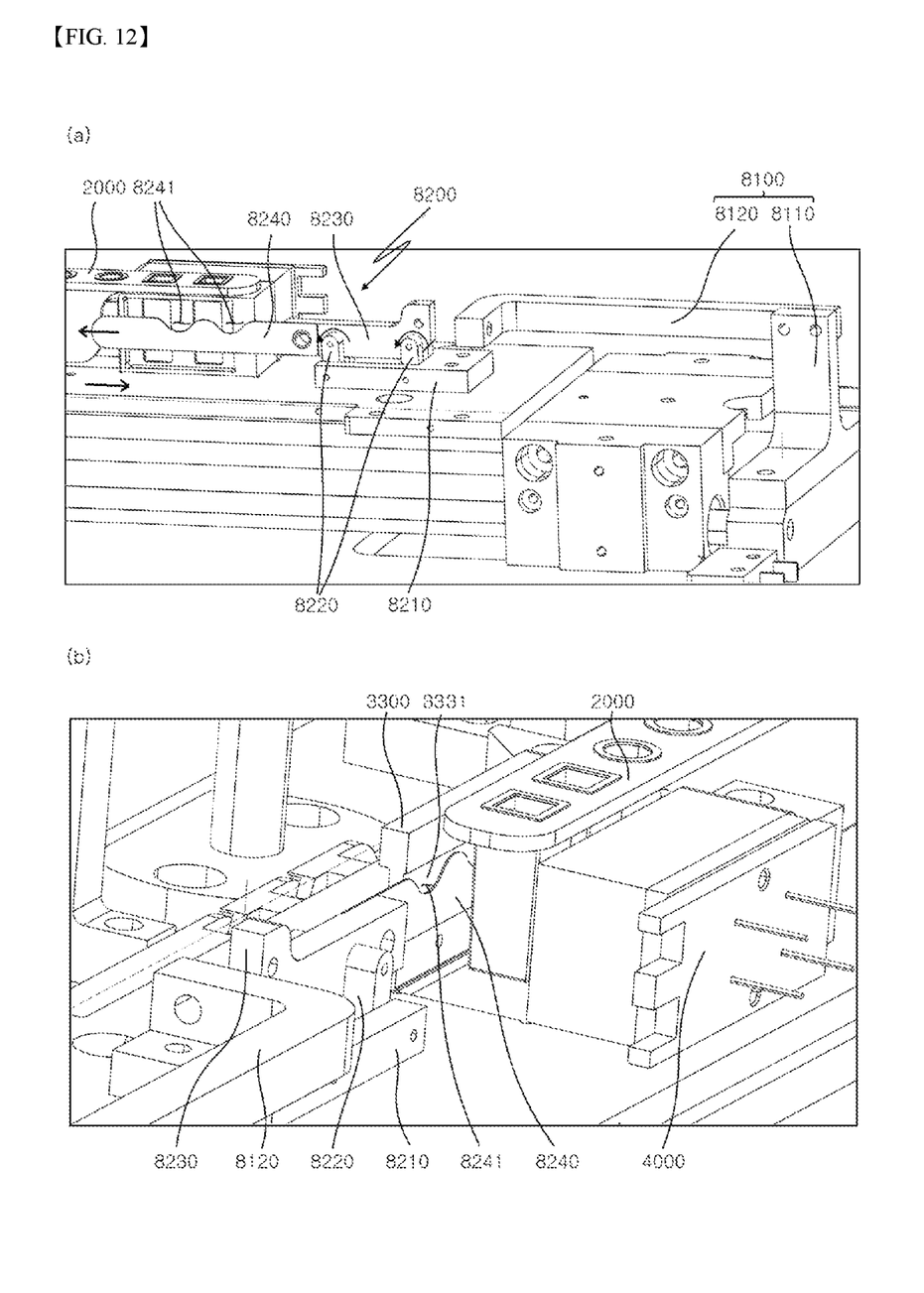
FIG. 12 is a view of a shutter unit in the automatic immunoassay system according to the present invention.

FIG. 12 is a view of the shutter unit 8000 in the automatic immunoassay system according to the present invention. Referring to FIG. 12, the shutter unit 8000 includes a shutter pushing portion 8100 and a shutter body 8200.

The shutter pushing portion 8100 is coupled to an upper surface of the holding plate 1100 to move the shutter body 8200. Specifically, the shutter pushing portion 8100 includes a push lever base 8110 and a push lever 8120.

The push lever base 8110 is coupled to the upper surface the holding plate 1100 so as to face the eighth well 2190.

The push lever 8120 is coupled to one end of the push lever base 8110 and extends towards the shutter body 8200. When the cartridge conveyance unit 5000 conveys the cartridge unit 2000 from the first well 2120 towards the eighth well 2190, the push lever 8120 pushes the shutter body 8200 to move the shutter body 8200 towards the eighth well 2190.

The shutter body 8200 is disposed between the light source unit 3000 and the well to block light emitted from the light source unit 3000 towards the wells or to allow the light emitted from the light source unit 3000 to reach the wells depending upon locations of the wells.

Specifically, the shutter body 8200 includes a base block 8210, a shutter link 8220, a shutter jig 8230, and a shutter plate 8240.

The base block 8210 is coupled to an upper portion of the cartridge mounting plate 5150 to be disposed near the eighth well 2190.

The shutter link 8220 is rotatably coupled at one end thereof to the base block and the shutter jig 8230 is rotatably coupled to the other end of the shutter link 8220.

That is, as the cartridge conveyance unit 5000 conveys the cartridge conveyance unit 5000 in a direction from the first well 2120 to the eighth well 2190, the push lever 8120 pushes the shutter jig 8230 towards the eighth well 2190. As a result, the shutter link 8220 is rotated to move the shutter jig 8230 in a direction from the eighth well 2190 to the first well 2120.

The shutter plate 8240 is rotatably coupled to one end of the shutter jig 8230 to be disposed between the light source unit 3000 and the well and is formed with light emission holes 8241.

In an Off state in which the push lever 8120 does not push the shutter jig 8230, the shutter plate 8240 blocks light emitted from the light source unit 3000 from being delivered to the seventh well 2180 and the eighth well 2190.

Then, after the tip 6000 is sequentially dipped in the first to eighth wells 2120 to 2190 to complete reaction, the light source unit 3000 emits light to the seventh well 2180 and the eighth well 2190. In this course, in an On state in which the push lever 8120 pushes the shutter jig 8230 to move the shutter plate 8240, the light emission holes 8241 formed through the shutter plate 8240 are disposed between the light source unit 3000 and the seventh and eighth wells 2180, 2190 such that light emitted from the light source unit 3000 can be delivered to the seventh well 2180 and the eighth well 2190.

Here, when the push lever 8120 pushes the shutter jig 8230 to move the shutter plate 8240, the shutter plate 8240 is moved while being kept parallel to the cartridge mounting plate 5150 such that the light emission holes 8241 of the shutter plate 8240 are arranged between the seventh well 2180 and the eighth well 2190.

To this end, the light source unit mounting block 3300 is formed with a shutter plate moving groove 3331 on a surface thereof facing the shutter plate 8240 such that the shutter plate 8240 can be inserted into the light source unit mounting block 3300 therethrough and can be moved while being kept parallel to the cartridge mounting plate 5150.

As a result, with the shutter unit 8000 adapted to block the light emitted from the light source unit 3000 from being delivered to the seventh well 2180 and the eighth well 2190 or to allow the light emitted from the light source unit 3000 to be delivered thereto, the automatic immunoassay system can perform more accurate assay of a sample by allowing the light emitted from the light source unit 3000 to be delivered to the wells after completion of warm-up of the light source unit 3000 such that the sample can be evenly irradiated with the light, when there is a need for warm-up of the light source unit 3000.

Although some embodiments have been described herein with reference to the accompanying drawings, it should be understood that these embodiments are provided for illustration only and are not to be construed in any way as limiting the present invention and that various modifications, changes, alterations, and equivalent embodiments can be made by those skilled in the art without departing from the spirit and scope of the invention. Therefore, all changes or modifications derived from the meaning and scope of the claims and equivalents thereto should be construed as being within the scope of the present invention.

<List of Reference Numerals>

| | |
|---|---|
| 1000: Case | 1100: Holding plate |
| 2000: Cartridge unit | 2100: Well cartridge |
| 2110: Tip storage well | 2120: First well |
| 2130: Second well | 2140: Third well |
| 2150: Fourth well | 2160: Fifth well |
| 2170: Sixth well | 2180: Seventh well |
| 2190: Eighth well | 2100a: Well holder |
| 2100b: Well protecting portion | 2200: Cartridge loading mechanism |
| 2210: Well support | 2211: Well insertion hole |
| 2220: Well cover | 2221: First cover hole |
| 2222: Second cover hole | 2223: Third cover hole |
| 2224: Fourth cover hole | 3000: Light source unit |
| 3100: First light source | 3200: Second light source |
| 3300: Light source unit mounting block | 3310: First light source coupling hole |
| 3320: Second light source coupling hole | 3331: Shutter plate moving groove |
| 4000: Sensing unit | 4100: First sensor |
| 4200: Second sensor | 4300: Sensing unit mounting block |
| 4310: Sensing unit-insertion block | 4311: First sensor coupling hole |
| 4312: Second sensor coupling hole | 4320: Sensing printed circuit board |
| 5000: Cartridge conveyance unit | 5100: Cartridge mount |
| 5110: First guide bar holding frame | 5120: Second guide bar holding frame |
| 5130: Conveyance guide bar | 5140: Conveyance frame |
| 5141: Guide bar passing hole | 5150: Cartridge mounting plate |
| 5200: Cartridge conveyer | 5210: Stepper motor |
| 5221: First rotary block | 5222: Second rotary block |
| 5230: Timing belt | 5240: Conveyance block |
| 6000: Tip | 7000: Tip conveyance unit |
| 7100: Tip holder | 7200: Tip conveyance unit |
| 7300: Tip vibrator | 8000: Shutter unit |
| 8100: Shutter pushing portion | 8110: Push lever base |
| 8120: Push lever | 8200: Shutter body |
| 8210: Base block | 8220: Shutter link |
| 8230: Shutter jig | 8240: Shutter plate |

The invention claimed is:

1. An automatic immunoassay system comprising:
a case provided with a holding plate therein;
a cartridge unit disposed inside the case, being coupled to the holding plate and formed with a plurality of wells;
a light source unit disposed at one side of the cartridge unit to emit light to the wells;

a sensing unit disposed at a side of the cartridge unit opposite to the light source unit to detect a fluorescence signal generated by light delivered to the wells;

a cartridge conveyance unit coupled to the cartridge unit and the holding plate and moving the cartridge unit on the holding plate in a horizontal direction;

a tip disposed above the cartridge unit to be sequentially dipped in the plurality of wells;

a tip conveyance unit coupled to an upper surface of the holding plate and moving the tip in an upward/downward direction; and a shutter unit disposed between the light source unit and the wells to block light emitted from the light source unit to the wells and to allow the light emitted from the light source unit to reach the wells, wherein the shutter unit comprises    a shutter body disposed between the light source unit and the wells to block light emitted from the light source unit from being delivered to the wells, and    a shutter pushing portion coupled to an upper portion of the holding plate to move the shutter body.

2. The automatic immunoassay system according to claim 1, wherein the cartridge unit comprises: a well cartridge provided with the plurality of wells; and a cartridge loading mechanism coupled to a lower portion of the well cartridge to couple the well cartridge to the holding plate.

3. The automatic immunoassay system according to claim 1, wherein the cartridge conveyance unit comprises: a cartridge mount coupling the cartridge unit to the holding plate; and a cartridge conveyer conveying the cartridge mount in a horizontal direction with reference to the holding plate.

4. The automatic immunoassay system according to claim 1, wherein the tip conveyance unit comprises: a tip holder holding the tip; and a tip conveyer conveying the tip holder in the upward/downward direction.

* * * * *